(12) United States Patent
Rayner et al.

(10) Patent No.: US 7,775,106 B2
(45) Date of Patent: Aug. 17, 2010

(54) NON-CONTACT RADAR BASED LEVEL MEASUREMENT DEVICE

(75) Inventors: Josh Rayner, Houston, TX (US); Michael Woodmansee, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 294 days.

(21) Appl. No.: 12/024,296

(22) Filed: Feb. 1, 2008

(65) Prior Publication Data

US 2009/0193888 A1 Aug. 6, 2009

(51) Int. Cl.
*G01F 23/28* (2006.01)
(52) U.S. Cl. .................................. 73/290 V; 73/290 R
(58) Field of Classification Search ............... 73/290 V, 73/290 R
See application file for complete search history.

(56) References Cited

U.S. PATENT DOCUMENTS

| | | | | |
|---|---|---|---|---|
| 4,833,918 A * | 5/1989 | Jean et al. | ................. | 73/290 V |
| 4,991,433 A * | 2/1991 | Warnaka et al. | ........... | 73/290 V |
| 5,438,867 A * | 8/1995 | van der Pol | ............... | 73/290 V |
| 5,609,059 A * | 3/1997 | McEwan | ................... | 73/290 R |
| 5,624,182 A | 4/1997 | Dearing, Sr. et al. | | |
| 6,491,421 B2 | 12/2002 | Rondeau et al. | | |
| 6,536,275 B1 * | 3/2003 | Durkee et al. | ............. | 73/290 V |
| 6,795,015 B2 * | 9/2004 | Edvardsson | ................. | 342/124 |
| 6,925,870 B2 * | 8/2005 | Pappas et al. | ............. | 73/290 V |
| 7,056,008 B2 | 6/2006 | Rondeau et al. | | |
| 7,328,611 B2 * | 2/2008 | Klees et al. | ............... | 73/290 V |
| 7,610,807 B2 * | 11/2009 | Skinner | ....................... | 73/319 |
| 2005/0072227 A1 * | 4/2005 | Carter | ...................... | 73/290 V |
| 2009/0013778 A1 * | 1/2009 | Schroth et al. | ........... | 73/290 V |

* cited by examiner

*Primary Examiner*—Hezron Williams
*Assistant Examiner*—Rodney T Frank
(74) *Attorney, Agent, or Firm*—David Cate; Rodney Warfford; Robin Nava

(57) ABSTRACT

A system and method for using a probe-based guided-wave radar sensor to measure fluid level in a container in a non-contact mode are provided. The system and method of the current invention replaces a wall section of the fluid container, such as a steel slurry tub with a panel of radar-transparent material, such as plastic. The level probe is mounted external to the container, adjacent to the radar-transparent panel. By avoiding contact between the sensor probe and the fluid, whether the fluid be cement slurry or another fluid prone to probe degradation, it is possible to eliminate the possibility of contamination, build-up, caking and/or damage to the probe along with the associated degradation in sensor performance.

25 Claims, 2 Drawing Sheets

NON-CONTACT RADAR BASED LEVEL MEASUREMENT DEVICE

FIELD OF THE INVENTION

The present invention relates generally to a measurement device for determining the level of a fluid in a container, and particularly to a method of using a radar-based contact level measurement probe in a non-contact manner to determine the level of a fluid in a container.

BACKGROUND OF THE RELATED ART

One of the many challenges in performing an oil well cementing operation may include accurately measuring the level of a cement slurry in a tub during some part of the mixing and pumping process. A number of different measurement techniques have been proposed for this purpose, including contact probe based techniques such as torque tubes, RF capacitance, guided wave and line powered radar. Each of these techniques has specific drawbacks, but universally such probes have a fundamental problem that they must actually be in contact with the cement slurry in order to measure the level of the slurry in the mix tub. These contact based techniques subject the probe to cement build-up which eventually results in a degradation in sensor performance associated with the build-up.

In response to this fundamental deficiency, a number of non-contact measurement techniques have been utilized, including ultrasonic transmission. However, ultrasonic non-contact sensors are functionally unreliable in some applications. For example, in cementing applications, ultrasonic non-contact sensors are unreliable in distinguishing between a cement slurry and a foam that often forms on the surface of the slurry during the mixing thereof. Accordingly, a new technique capable of measuring the level of a fluid in a container without contacting the fluid is desired.

SUMMARY OF THE INVENTION

The current invention is directed to a non-contact radar-based level measurement device incorporating a radar probe in combination with a specially designed cement slurry mix tub.

In one embodiment, the non-contact radar-based level measurement device includes a cement slurry mix tub where a portion of one wall thereof is formed of a substantially radar-transparent material, and wherein a radar-based probe of the measurement device is positioned adjacent to this radar-transparent wall portion.

In another embodiment, the probe is enclosed by a shield wall to prevent contamination of the probe by external sources.

In still another embodiment, the invention is drawn to a non-contact method of measuring a fluid level in a container using a radar probe measuring device.

BRIEF DESCRIPTION OF THE DRAWINGS

The above-mentioned and other features of this invention and the manner of obtaining and using them will become more apparent, and will be best understood, by reference to the following description, taken in conjunction with the accompanying drawings, wherein.

DETAILED DESCRIPTION OF THE INVENTION

Figure 1:
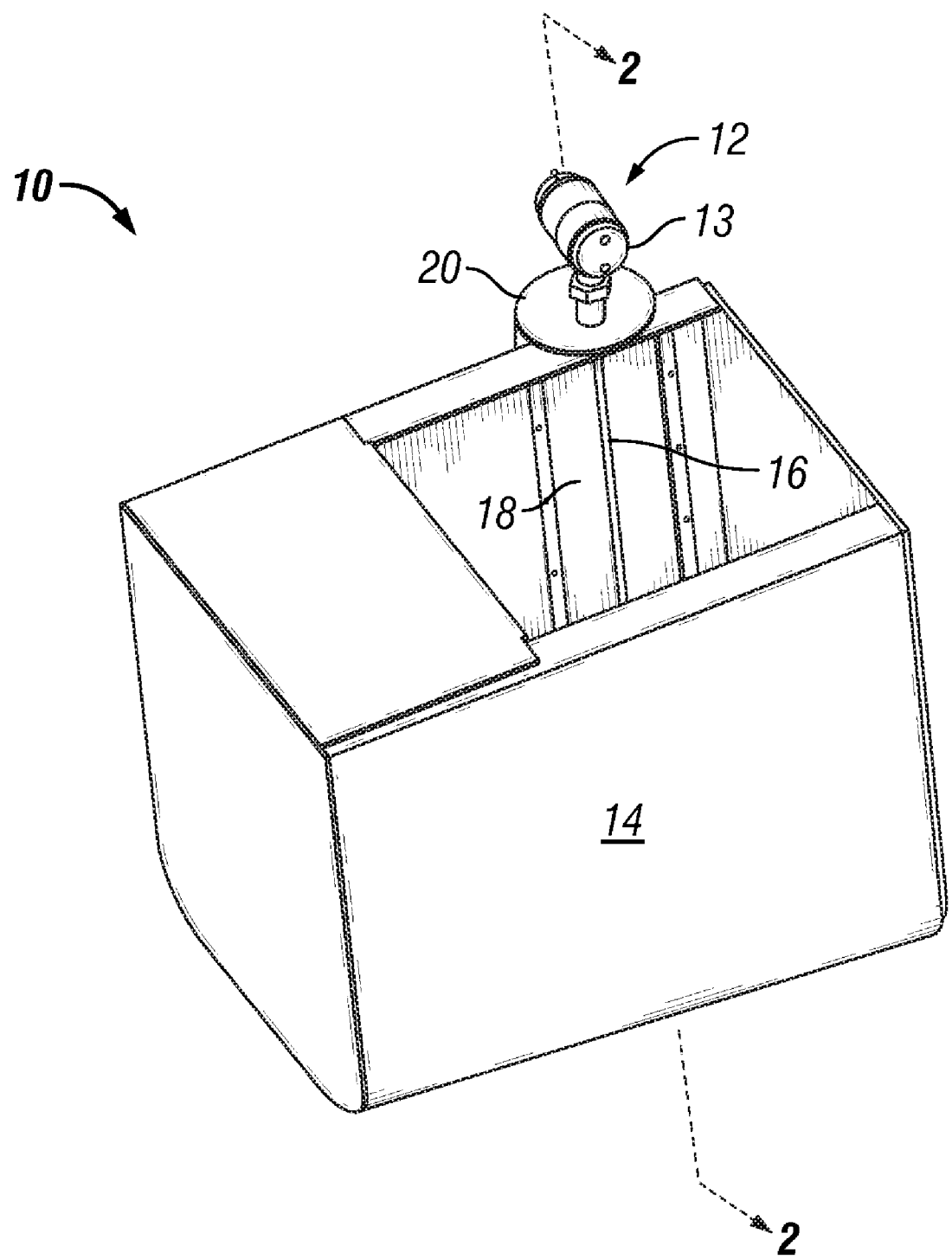
FIG. 1 is a side perspective view of a cement slurry mix tub incorporating an exemplary embodiment of a radar-based probe level measurement device of the current invention.

Embodiments of the current invention are described with reference to certain measurement devices for determining the level of a fluid in a container, such as the level of a cement slurry in a mix tub. However, the measurement device may be employed for monitoring the level of any one of a variety of abrasive or corrosive fluids, among other fluids. Of note, embodiments described herein may be particularly beneficial for measuring the level of fluids, such as a cement slurry, that would have a tendency to "build-up" or "cake" on a conventional level measurement probe, and thus degrade the accuracy of such a probe.

In one embodiment of the present invention, this is accomplished by providing a specially designed fluid container for integrating and isolating a radar probe away from the fluid to be measured. As detailed below, this is achieved by mounting the radar probe adjacent to a radar-transparent panel which is integrated into the fluid container. This panel permits the transmission of radar signals from the radar probe to the fluid in the fluid container, allowing the radar probe to monitor the level of the fluid in the fluid container, without contacting the fluid.

As such, in one embodiment the present invention is directed to a system and method for using a probe-based guided-wave radar sensor to measure the fluid level in a fluid container in a non-contact mode. By avoiding contact between the sensor probe and the fluid, whether the fluid be a cement slurry or other abrasives or corrosives, it is possible to eliminate the possibility of build-up on the probe, along with the associated degradation in sensor performance.

In summary, the system and method of the current invention replaces a wall section of the fluid container, such as, for example, a stainless steel slurry tub, with a panel of radar-transparent material, such as for example, a plastic material. The level probe is mounted external to the container, adjacent to the radar-transparent panel. By locating the measurement probe external to the container, the probe is isolated from the fluid and the possibility of fluid build-up or caking on the probe, eliminating the associated degradation in sensor performance.

To understand the function of the current system it is important to first comprehend the theory behind operation of radar-based probes. Guided-wave level measurement is generally based on a time domain reflectometry principle. In operation, high frequency pulses are guided down a probe. When the pulses reach a media with a different dielectric constant, part of the energy is reflected back to the transmitter. The time difference between the transmitted and reflected pulse is converted into a distance from which the fluid level is calculated.

The method and system of the current invention takes advantage of the fact that there is a significant disparity between the dielectric constant of many radar-transparent materials, such as, for example plastic, which may have a dielectric constant from about 2.0 to 4.0; and that of water-based fluids, such as, for example a cement slurry, which may have a dielectric constant of around 80.0. The portion of the wall of the container adjacent to the probe is formed of one such substantially radar-transparent materials. Because the probe is positioned adjacent to the section of the container formed of the relatively transparent material, the radar pulses from the probe are transmitted through the outer wall of the container without significant interference. In contrast, the fluid interface presents a much stronger reflection so that during operation the radar pulses will pass through the radar-transparent wall of the container and be reflected by the fluid providing a measure of the fluid level or volume.

Figure 2:
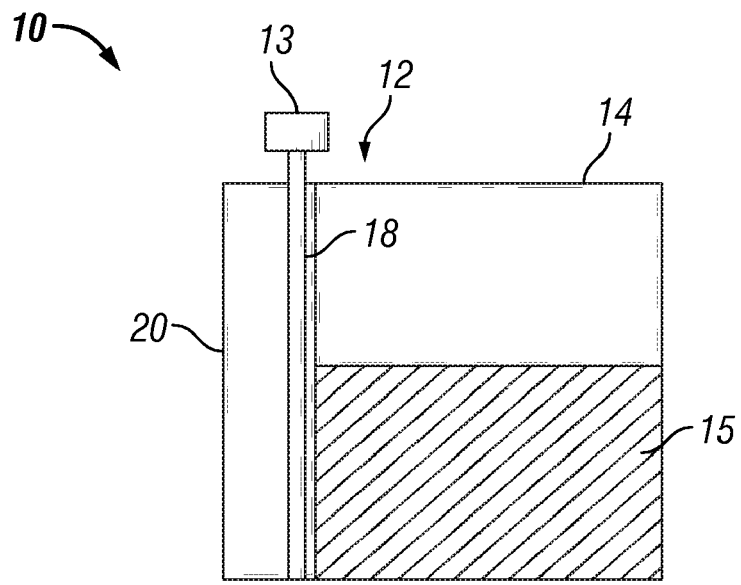
FIG. 2 is a cross-sectional view of the embodiment of FIG. 1.

Referring now to FIGS. 1-2, an embodiment of a fluid level measurement system 10 is shown. In this system 10, a probe-based guided-wave radar measurement device 12 is positioned adjacent to a fluid container 14. As shown, the fluid container 14 is formed of a series of interconnecting walls, having a roughly rectangular cross-section. It should be understood that the level measurement system 10 of the current invention may be incorporated into any size or shape container, including for example, spherical or cylindrical containers. Likewise, the level measurement system 10 of the current invention may be used with a container constructed of any suitable material, such as, for example, steel, plastic, or a composite.

Regardless of the exact size, shape or construction of the container 14, in most embodiments, as in the embodiments of FIGS. 1-2, the radar-based measurement device 12 includes a transmitter 13 and an elongated probe 16 designed to be positioned in relation to the container 14 such that the measurement portion of the probe 16 descends from the top of the container 14 to the bottom of the container 14 to allow the probe 16 to measure the entire level of the container 14. Although an elongated probe 16 is shown in the current embodiment, it should be understood that the probe 16 may be positioned in the current system in any manner necessary to ensure that the probe 16 is able to monitor the desired level changes of the fluid 15 retained within the container 14 (note that the fluid 15 is omitted from FIG. 1 for clarity, but is shown in FIG. 2).

Figure 3:
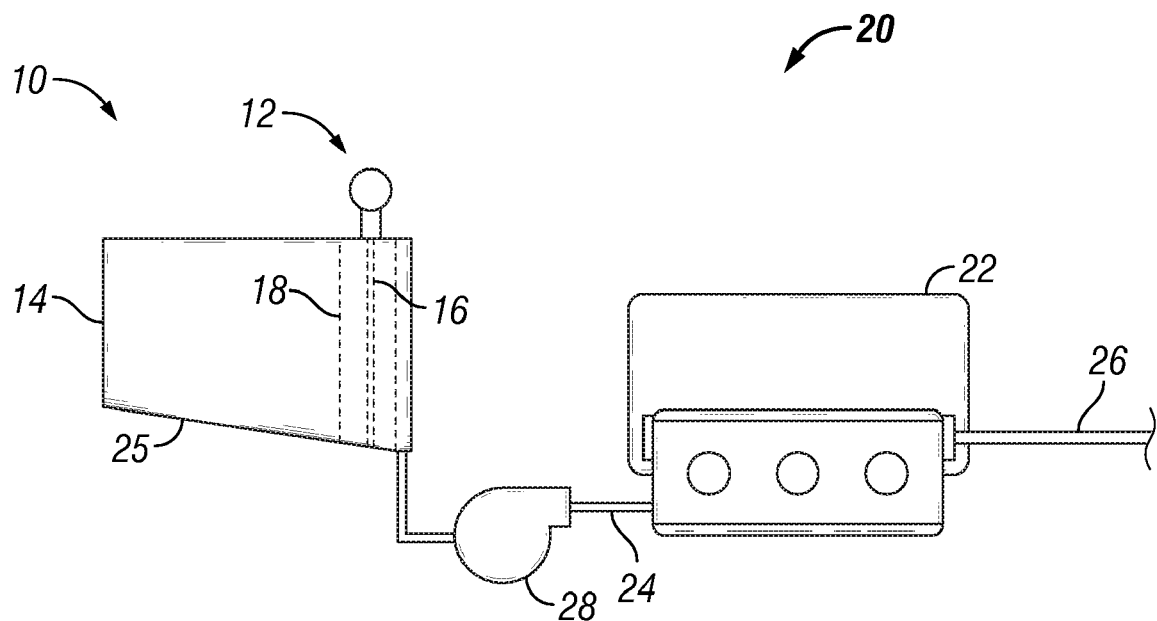
FIG. 3 is a side view of a pump assembly employing the cement slurry mix tub of FIG. 1.

Because any geometrically shaped container may be used with the current invention, it should be understood that the top of the container 14 is defined as the position that the upper surface of the fluid 15 reaches when the container 14 is full, and the bottom of the container 14 is defined as the position that the upper surface of the fluid 15 reaches when the container 14 is substantially empty. Although not shown in FIG. 1, it should be understood that the level measurement system 10 may also include features to bias the fluid 15 toward the measurement probe 16. For example, the container 14 may include a sloped floor 25 which is angled toward the probe 16 as is shown in FIG. 3.

To allow the radar emissions of the probe 16 to penetrate the container 14, at least a portion 18 of the outer wall of the container 14 is formed of a substantially radar-transparent material, such as, a plastic material, among other appropriate materials. This radar-transparent portion 18 of the container 14 is arranged in alignment with the elongated probe 16 to allow emission from any portion of the probe 16 to penetrate the outer wall of the container 14. Although a transparent portion made of plastic is described herein, it should be understood that any material having a dielectric constant that is substantially more transparent to radar emission than the fluid 15 to be measured may be used in accordance with the current invention.

In one embodiment, the level measurement system 10 of the current invention may also include a shield to prevent external interferences and contaminants from interacting with the probe 16. In one such embodiment, as shown in FIGS. 1-2, the shield may comprise an outer housing 20 that surrounds the exposed sides of the elongated probe 16. Such a housing 20 would be mounted to the container 14 to ensure that no part of the measurement portion of the probe 16 is exposed to the external environment.

Although a semi-cylindrical housing is shown in FIGS. 1-2, it should be understood that any shape shield housing 20 may be used such that the probe 16 is sufficiently protected from external interference. In the embodiments shown in FIGS. 1-2, the outer wall of the container 14 forms one wall of the housing surrounding the probe 16, and the shield housing itself 20 forms the other sides of the complete housing.

Although the above disclosure focuses on the level measurement system 10 itself, it should be understood that the current invention is also directed to methods of measuring a fluid 15 that is disposed within a fluid container 14. Such methods include arranging a radar-based contact probe 16 external to the fluid container 14, where the fluid container is either made of a radar-transparent material or features a radar-transparent panel 18 in an outer wall of the fluid container 14 as described above.

Referring now to FIG. 3, the level measurement system 10 of FIG. 1 is shown incorporated into a larger pump assembly 20. In the embodiment shown, the mix tub 14 delivers a fluid 15, such as a cement slurry, to a high pressure pump 22 for operations at an oilfield. For oil well cementing operations, the constituents of a cement product are mixed in the mix tub 14. As such, the mix tub 14 typically includes a pump 28 which facilitates a mixing of the cement constituents and delivers the mixture in a slurry form to the high pressure pump 22 through dispensing line 24.

In order to be strong enough to withstand the weight and density of the cement slurry mixed therein, oilfield mix tubs are typically constructed of a metal material. However, use of such a metal mix tub, cannot be used with an externally mounted non-contact radar probe, since the signals from such a probe would be reflected off of the metal material of the tub and not reach the fluid contained therein. As such, a mix tub 14 in accordance with the present invention includes a radar-transparent panel 18 which allows an externally mounted radar probe to transmit radar signals therethrough to determine the level of the fluid in the mix tub 14. Alternatively, as mentioned above, the entire mix tub may be constructed of a radar-transparent material.

FIG. 3 also shows a high pressure pump 22, which receives the cement slurry from the mix tub 14. The high pressure pump 22 may be any pump appropriate for receiving the cement slurry at a relatively low pressure and dispensing it at a relatively high pressure to an output line 26. An exemplary pump for this purpose includes a positive displacement pump, such as a triplex pump. The output line 26 directs the cement slurry to an oil well, wherein the cement is injected for the purpose of performing an oil well cementing operation.

As indicated above, the embodiments described herein allow a contact measurement level probe to monitor the level of a fluid without contacting the fluid, such that concerns related to the exposure of degradable probe components to the fluid, and/or build up or caking of the fluid on the probe, are eliminated. For example, the susceptibility to cement build-up on the transmissive portions of a radar-based measurement probe, which typically occurs in containers that have probes in contact with a cement slurry, is not of significant concern in embodiments described herein due to the probe's isolation from the fluid within the container. In addition, regular maintenance and cleaning of the probe may not be as critical to probe function as the likelihood of buildup on the probe is greatly reduced.

While exemplary embodiments are described with reference to particular level measurement devices for cement slurry, other embodiments are possible. Additionally, many changes, modifications, and substitutions may be made without departing from the scope of the described embodiments.

What is claimed is:

1. An oil well cementing unit comprising:
    a non-contact fluid level measurement system comprising:
        a mix tub comprising an outer wall, wherein at least a portion of said outer wall comprises a measurement panel, said measurement panel comprising a substantially radar-transparent material; and
        a guided-wave radar-based fluid measuring probe disposed external to the outer wall of the mix tub and adjacent to said measurement panel, such that emissions from the probe penetrate said outer wall through said measurement panel to allow a level of a fluid in the mix tub to be monitored by the fluid measuring probe; and
    a pump in fluid communication with the mix tub, wherein the pump receives the fluid at a low pressure and injects the fluid at a high pressure into an oil well during an oil well cementing operation.

2. The oil well cementing unit of claim 1 wherein the measuring probe is elongated and extends from a top portion of the mix tub to a bottom portion of the mix tub.

3. The oil well cementing unit of claim 1 wherein the fluid comprises a cement slurry.

4. The oil well cementing unit of claim 1 wherein the radar-transparent material has a dielectric constant that is less than the dielectric constant of the fluid.

5. The oil well cementing unit of claim 1 wherein the radar-transparent material comprises a plastic material.

6. The oil well cementing unit of claim 1 further comprising a shield wall arranged to surround at least a portion of the externally positioned measuring probe.

7. The oil well cementing unit of claim 1, wherein the pump is a positive displacement pump.

8. The fluid measurement system of claim 1 wherein the bottom portion of the fluid holding container is sloped downwardly toward the measuring probe.

9. A non-contact fluid level measurement system comprising:
    a fluid-holding container comprising an outer wall, wherein at least a portion of said outer wall comprises a measurement panel, said measurement panel being constructed of a substantially radar-transparent material; and
    a guided-wave radar-based fluid measuring probe disposed external to the outer wall of the fluid holding container and adjacent to said measurement panel, such that emissions from the probe penetrate said outer wall through said measurement panel to allow a level of a fluid in the container to be monitored by the fluid measuring probe.

10. The fluid measurement system of claim 9 wherein the fluid holding container comprises a top portion where an upper surface of the fluid disposed therein is positioned when the fluid container is full, and a bottom portion where the upper surface of the fluid disposed therein is positioned when the fluid container is substantially empty; and where the measurement panel spans a portion of the outer wall from the top portion to the bottom portion of the fluid holding container.

11. The fluid measurement system of claim 10 wherein the measuring probe is elongated and extends from the top portion to the bottom portion of the fluid holding container.

12. The fluid measurement system of claim 9 wherein the fluid is one of an abrasive and a corrosive fluid.

13. The fluid measurement system of claim 9 wherein the fluid is substantially prone to one of caking and buildup.

14. The fluid measurement system of claim 9 wherein the fluid is a cement slurry.

15. The fluid measurement system of claim 9 wherein the radar-transparent material has a dielectric constant that is less than a dielectric constant of the fluid.

16. The fluid measurement system of claim 9 wherein the radar-transparent material comprises a plastic material.

17. The fluid measurement system of claim 9 wherein the fluid holding container is a slurry tub.

18. The fluid measurement system of claim 9 wherein the container is formed of a material chosen from the group consisting of a metal, a plastic and a composite material.

19. The fluid measurement system of claim 9 wherein both the outer wall and the measurement panel of the container are composed of a radar-transparent material.

20. The fluid measurement system of claim 9 further comprising a shield wall arranged to surround at least a portion of the externally positioned measuring probe.

21. The fluid measurement system of claim 20 wherein the shield wall is attached to the outer wall of the fluid holding container.

22. The fluid measurement system of claim 20 wherein the shield wall fully surrounds the measuring probe, and wherein the portion of the shield wall adjacent to the measurement panel comprises a substantially radar-transparent material.

23. A method of measuring a fluid level within a container comprising:
    providing a fluid-holding container comprising an outer wall;
    providing a measurement panel in said outer wall, wherein said measurement panel comprises a substantially radar-transparent material;
    providing a guided-wave radar-based fluid measuring probe;
    positioning said radar-based fluid measuring probe external to the outer wall of the fluid holding container and adjacent to said measurement panel;
    activating said radar-based fluid measuring probe such that emissions from the probe penetrate said outer wall through said measurement panel to monitor the level of a fluid in the fluid holding container.

24. The method of claim 23 further comprising surrounding at least a portion of the externally positioned measuring probe with a shield.

25. A method of performing an oil well cementing operation comprising:
    measuring the level of the fluid within the fluid holding container according to the method of claim 23, wherein the fluid is a cement slurry and the fluid holding container is a mix tub; and
    providing a pump in fluid communication with the mix tub, wherein the pump receives the cement slurry at a low pressure and injects the cement slurry at a higher pressure into an oil well during an oil well cementing operation.

* * * * *